(12) United States Patent
Nielsen et al.

(10) Patent No.: US 12,215,669 B2
(45) Date of Patent: Feb. 4, 2025

(54) COMPONENT PLATFORM LOCK WITH COLLETS AND METHOD FOR HOLDING A WIND TURBINE BLADE COMPONENT

(71) Applicant: LM Wind Power A/S, Kolding (DK)

(72) Inventors: Christian Nielsen, Kolding (DK); Jeppe Andersen, Kolding (DK); Thomas Nytoft, Kolding (DK); Johnny Eriksen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/576,932

(22) PCT Filed: Jul. 4, 2022

(86) PCT No.: PCT/EP2022/068449
§ 371 (c)(1),
(2) Date: Jan. 5, 2024

(87) PCT Pub. No.: WO2023/280774
PCT Pub. Date: Jan. 12, 2023

(65) Prior Publication Data
US 2024/0384702 A1    Nov. 21, 2024

(30) Foreign Application Priority Data
Jul. 7, 2021   (EP) ...................................... 21184248

(51) Int. Cl.
*F03D 13/10*   (2016.01)

(52) U.S. Cl.
CPC ...... *F03D 13/104* (2023.08); *F05B 2230/604* (2013.01); *F05B 2240/302* (2013.01)

(58) Field of Classification Search
CPC .... F03D 1/0675; F03D 1/0677; F03D 1/0683; F05B 2240/301; F05B 2240/302; F05B 2240/31; F05B 2240/307
See application file for complete search history.

(56) References Cited

U.S. PATENT DOCUMENTS

| | | | |
|---|---|---|---|
| 9,797,369 B2 * | 10/2017 | Kratmann | F03D 1/0633 |
| 10,584,677 B2 * | 3/2020 | Sanz Pascual | F03D 1/0675 |
| 10,900,469 B2 * | 1/2021 | Merzhaeuser | F03D 80/50 |
| 11,319,922 B2 * | 5/2022 | Bech | F03D 1/0658 |
| 11,536,246 B2 * | 12/2022 | Huth | F03D 1/0675 |
| 11,795,907 B2 * | 10/2023 | Merzhaeuser | F03D 1/0675 |
| 11,802,542 B2 * | 10/2023 | Agarwal | F03D 1/0675 |
| 11,828,264 B2 * | 11/2023 | Merzhaeuser | F03D 1/0675 |
| 11,994,101 B2 * | 5/2024 | Festner | F03D 1/0675 |
| 12,071,923 B2 * | 8/2024 | Huth | F03D 1/0677 |

(Continued)

FOREIGN PATENT DOCUMENTS

EP    2283230 B1    5/2012

*Primary Examiner* — Jason L Vaughan
(74) *Attorney, Agent, or Firm* — Nath, Goldberg & Meyer; Jerald L. Meyer (57) ABSTRACT

A component platform lock for holding a wind turbine blade component during attachment of the wind turbine blade component to a wind turbine blade shell part, the component platform lock comprising a first and second moving pin, first and second inner cone stud and first and second collets surrounding the inner cone stud, the collets expanding based on the movement of the inner cone stud relative to the collets.

15 Claims, 8 Drawing Sheets

(56) References Cited

U.S. PATENT DOCUMENTS

| | | | |
|---|---|---|---|
| 2011/0020126 A1* | 1/2011 | Glenn | F03D 80/00 |
| | | | 416/223 A |
| 2011/0091326 A1* | 4/2011 | Hancock | F03D 1/0675 |
| | | | 29/889.7 |
| 2014/0150227 A1 | 6/2014 | Teichert | |
| 2015/0147187 A1 | 5/2015 | Lipka | |
| 2019/0299343 A1 | 10/2019 | Schuring | |
| 2022/0003202 A1* | 1/2022 | Riahi | F03D 1/0675 |
| 2023/0258156 A1* | 8/2023 | Nytoft | B29C 65/483 |
| | | | 156/60 |
| 2023/0374971 A1* | 11/2023 | Huth | F03D 1/0677 |

* cited by examiner

Fig. 10

COMPONENT PLATFORM LOCK WITH COLLETS AND METHOD FOR HOLDING A WIND TURBINE BLADE COMPONENT

This is a National Phase Application filed under 35 U.S.C. 371 as a national stage of PCT/EP2022/068449, filed Jul. 4, 2022, an application claiming the benefit of European Patent Application No. 21184248.9, filed Jul. 7, 2021, the contents of each of which are hereby incorporated by reference in their entirety.

FIELD OF THE DISCLOSURE

The present disclosure relates to a system and method for holding a wind turbine blade component during attachment to a wind turbine blade shell part.

BACKGROUND

In segmented wind turbines a receiver on one segment and a spar beam that is inserted into the receiver in a different segment may be used to attach different segments of the wind turbine blade to each other, see for example, WO 2020/180601 A1.

Wind turbine blades comprise a shell part and may comprise wind turbine blade component part(s), such as the receiver of the segmented wind turbine blade, as described before, which are to be attached to the shell part during a bonding process. During attachment of the wind turbine blade component to the shell part, the wind turbine blade component is to be held in place relative to the shell part.

During the holding/fixation of the wind turbine blade component it is important that no axial movement of the component occurs, that the connection to the component is stiff and that no damage is done to the component or parts thereof.

Object of the Disclosure

It is an object of the present disclosure to alleviate some of the problems of existing solutions or to provide an alternative to the prior art.

SUMMARY

It is an object of the present disclosure to provide in a first aspect a component platform lock for holding a wind turbine blade component during attachment of the wind turbine blade component to a wind turbine blade shell part.

The component platform lock may comprise a housing.

The component platform lock may comprise a first moving pin. The first moving pin may comprise a first inner cone stud having a first diameter at a first section and a second diameter at a second section. The first diameter being larger than the second diameter. The first moving pin may comprise a first collet having an expanding section surrounding the first inner cone stud and configured to move along the first inner cone stud between the second section and the first section. The expanding section of the first collet will contract and expand based on the diameter of the cone stud.

The wind turbine blade component may be held by a jig or other holding devices, and the component platform lock may lock the wind turbine blade component to the holding device. Furthermore, the disclosed component platform lock may be disengaged (remotely) after the attachment process of the wind turbine blade component is completed.

The wind turbine blade component, e.g. if being a receiver for coupling of blade parts of a segmented blade, may contain bushings for the inserting of a pin lock, e.g. to lock the receiver to a spar beam. These bushings can thereby also be used, by the disclosed component platform lock, to hold/lock the receiver to the holding device during the wind turbine blade component's bonding with the shell part.

It is a further advantage of the present disclosure that risk of damage or deformation of such bushings during the holding process is reduced or avoided. If the bushings are damaged or deformed, the pin lock might not be able to be inserted and the joining of the two segments would not be possible.

It is a further advantage of the present disclosure, that the platform lock limits or avoids exertion of any axial forces to the bushings, and that it is able to release and/or retract from the bushings. And further that the component platform lock functions even if the wind turbine blade component has large attachment tolerances.

The component platform lock may comprise a first actuator configured to move the first moving pin, such as to obtain a contracted state wherein the first collet is located within the housing, and an extended state wherein the first collet extends out of the housing.

The component platform lock may comprise a second actuator configured to move the first inner cone stud relative to the first collet, such as to obtain a relaxed state wherein the expanding section of the first collet is retracted and surrounds the second section of the first inner cone stud having the second diameter, and an expanded state wherein the expanding section of the first collet is expanded and surrounds the first section of the first inner cone stud having the first diameter, and wherein in the expanded state, the expanding section is configured to engage and hold the wind turbine blade component.

The component platform lock is advantageous since it ensures that the locking mechanism in the form of the first collet can be driven into a bushing of the wind turbine blade component without or with a very limited need for exerting any axial forces and allows for larger tolerances of the bushing, since the first collet may be expanded until a sufficient lock is achieved. The release and retracting of the lock are further easier as it can be completed by the same mechanism for engaging the bushing. Since the first collet expands from a relaxed state to an expanded state within the bushing, deformation of the bushing is less likely since the first collet is extended when its diameter is smaller than the bushing.

In some embodiments, the component platform lock may further comprise a second moving pin. The second moving pin may comprise a second inner cone stud. The second inner cone stud may have a first diameter at a first section and a second diameter at a second section of the second cone stud. The first diameter may be larger than the second diameter. A second collet may have an expanding section surrounding the second inner cone stud and configured to move along the second inner cone stud.

Incorporation of a second cone stud may facilitate that the component is held firmly and, in some embodiments, ensure sufficient engagement between the component platform lock and the wind turbine blade component. Further, it allows for two engagements points leading to better stability.

In some embodiments, the wind turbine blade component is a receiver for a segmented wind turbine. Such a receiver may comprise one or more, such as two, bushings for the attachment of a pin. Having a first and a second collet allows for the use of two (e.g. opposite) bushings of the receiver to hold the receiver during bonding with the blade shell.

In some embodiments, the first actuator or a third actuator may be configured to move the second moving pin, e.g. to obtain a contracted state wherein the second collet is located within the housing, and an extended state wherein the second collet extends out of the housing.

The second actuator or a fourth actuator may be configured to move the second inner cone stud relative to the second collet, e.g. to obtain a relaxed state wherein the expanding section of the second collet is retracted and surrounds the second section of the second inner cone stud having the second diameter, and an expanded state wherein the expanding section of the second collet is expanded and surrounds the first section of the second inner cone stud having the first diameter, and wherein in the expanded state, the expanding section of the second collet is configured to engage and hold the wind turbine blade component.

In some embodiments, the first and second moving pin extend in opposite directions. This may allow the platform lock to be used in embodiments where the wind turbine blade component is a receiver in a segmented wind turbine blade.

In some embodiments, the component platform lock may further comprise an alignment sensor for aligning the first and second moving pin with bushings of the wind turbine blade component.

In some embodiments, the component platform lock may further comprise one or more force sensors measuring the force exerted by the second and/or fourth actuator.

In some embodiments, the component platform lock may further comprise one or more extension sensors for monitoring the extension of the first and/or second moving pin. The extension sensor may monitor the position of the first and/or second moving pin, e.g. relative to the housing.

In some embodiments, the first, second, third and/or fourth actuator are hydraulic, pneumatic, electrical or mechanical.

In some embodiments, the first and/or second inner cone stud are conical in shape. For example, the first and/or second inner cone stud may be decreasing linearly in diameter from the first section to the second section.

In a second aspect of the disclosure, a system for attaching a wind turbine blade component to a surface of a wind turbine blade shell part at a component attachment position is provided.

The system may comprise a blade shell part support for supporting the blade shell part.

The system may comprise a jig. The jig may comprise a jig base. The jig may comprise a component platform comprising a component platform lock for receiving and holding the wind turbine blade component in a first position above at least a part of the blade shell part. The component platform lock of the system may be the component platform lock as described in relation to the first aspect. The component platform may be arranged on the jig base and may be at least vertically displaceable relative to the jig base by displacement means to allow the wind turbine blade component to be lowered from the first position to a component attachment position.

In a third aspect of the disclosure, a method for holding a wind turbine blade component during attachment of the wind turbine blade component to a wind turbine blade shell part is provided.

The wind turbine blade component may comprise a cavity containing one or more bushings, e.g. at the cavity's sidewalls.

The method may comprise providing a jig comprising a component platform lock, such as the component platform lock as described in relation to the first aspect.

The method may comprise moving the component platform lock into the cavity of the wind turbine blade component.

The method may comprise extending the first moving pin from the contracted state to the extended state to place the first moving pin into a busing of the one or more bushings of the wind turbine blade component.

The method may comprise expanding the first collet from its relaxed state into its expanded state by moving the first inner cone stud to expand the first collet in the bushing to engage and hold the wind turbine blade component.

The method may comprise positioning the wind turbine blade component by use of the jig to a component attachment position relative to the wind turbine blade shell part.

In some embodiments, the method may comprise retracting the first collet into its relaxed state to disengage the bushing after attachment of the wind turbine blade component, retracting the first moving pin, and/or moving the component platform lock out of the cavity of the wind turbine blade component.

In some embodiments, the method may comprise providing the jig with the component platform lock having the first and second moving pin, first and second inner cone stud, and first and second collets. The method may comprise extending the second moving pin from the contracted state to the extended state to place the first moving pin into a second bushing of the one or more bushings of the wind turbine blade component. The method may comprise expanding the second collet from its relaxed state into its expanded state by moving the second inner cone stud to expand the second collet in the second bushing to engage and hold the wind turbine blade component.

In some embodiments, the method may further comprise retracting the second collet into its relaxed state, e.g. to disengage the second bushing after attachment of the wind turbine blade component. The method may further comprise retracting the second moving pin.

In some embodiments, the method further comprises monitoring the expansions of the collets by measuring the force(s) exerted by the second and/or fourth actuator and optionally stopping the expansion when the force exerted reaches a threshold.

In some embodiments, the method may further comprise, e.g. as part of the step of extending the first and/or second moving pin into the bushing, using the alignment sensor(s) to align the first and/or second moving pin with the bushing(s) of the wind turbine blade component.

In some embodiments, the method may further comprise a step of monitoring the extension of the first and/or second moving pin by the extension sensor(s).

BRIEF DESCRIPTION OF THE FIGURES

Embodiments of the disclosure will be described in more detail in the following with regard to the accompanying figures. The figures show one way of implementing the present disclosure and are not to be construed as being limiting to other possible embodiments falling within the scope of the attached claim set.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1:
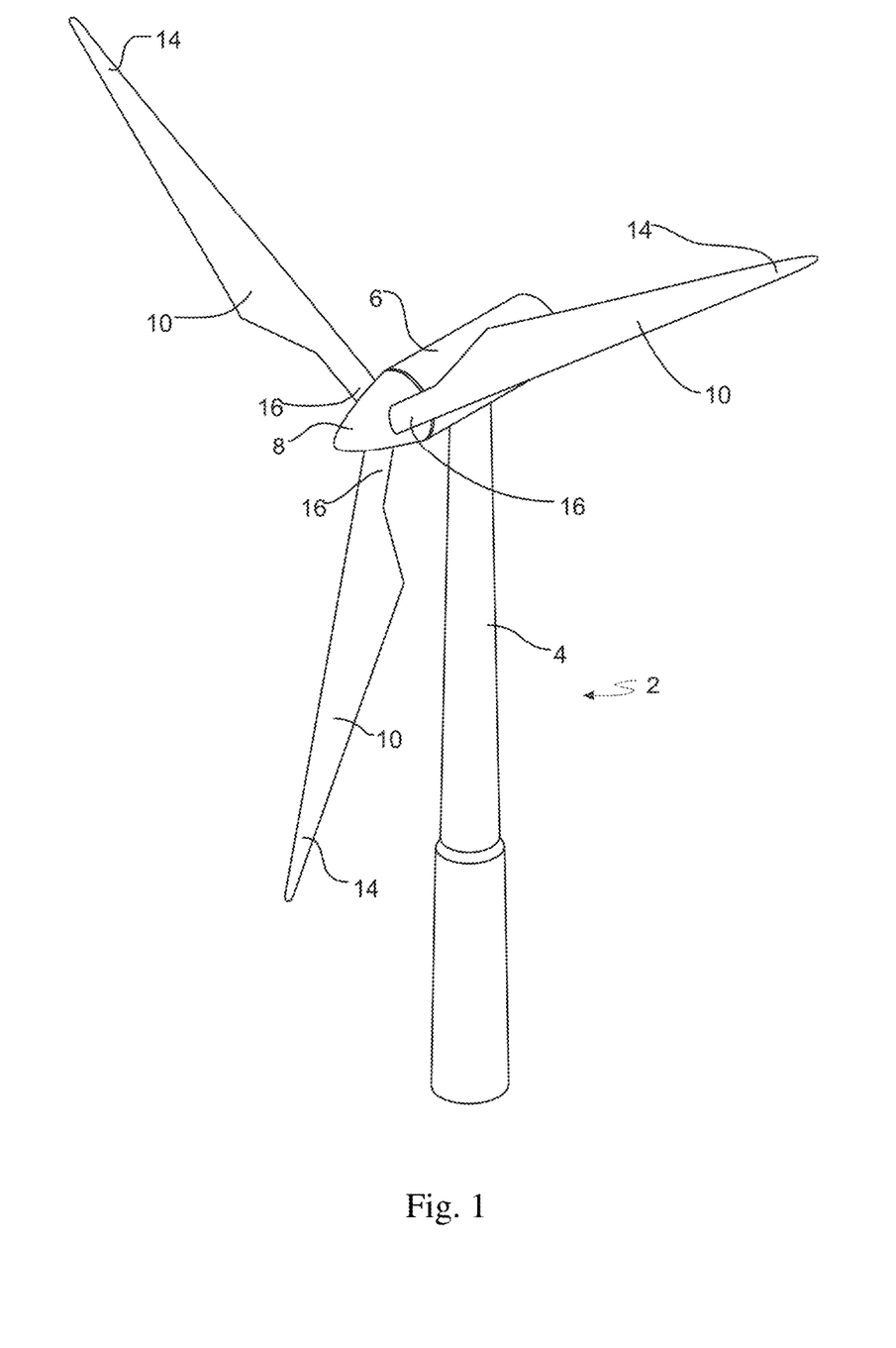
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
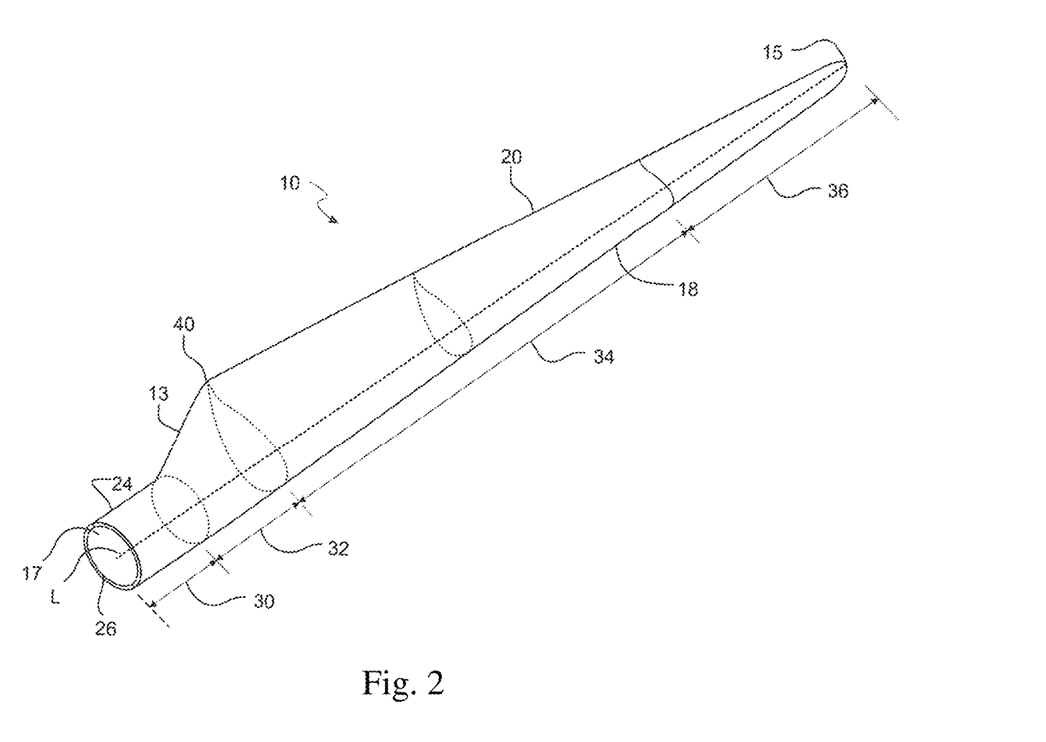
FIG. 2 is a schematic perspective view of a wind turbine blade for a wind turbine as shown in FIG. 1.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

Figure 3:
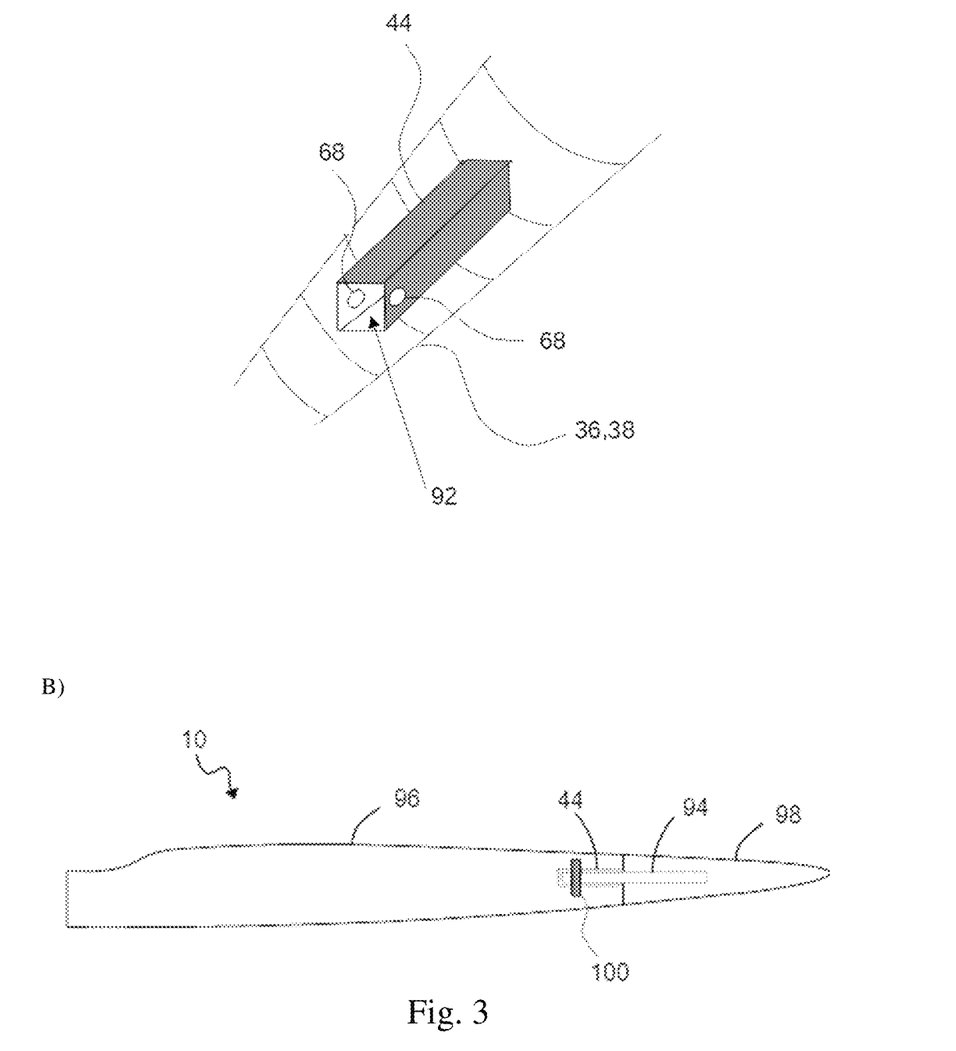
FIG. 3 illustrates a wind turbine blade component attached to a wind turbine blade shell.

As shown in FIG. 3A), the wind turbine blade may consist of a shell part, either a pressure side shell part 36 or suction side shell part 38, wherein is attached a wind turbine blade component 44.

The shell part and the wind turbine blade component may be separately manufactured and attached to each other during a bonding process. In order to attach the shell part 36, 38 and the wind turbine blade component 44 the wind turbine blade component 44 is held still on the shell part 36, 38 during the attachment process to ensure that the blade shell 36, 38 does not get damaged or deformed and to ensure that the receiver is located at the correct location on the shell part.

The wind turbine blade component 44 contains a number of bushings 68 to, in some embodiments, attach a first and a second blade segment 96, 98 together by use of a pin. As seen in FIG. 3A), the bushings are located within a cavity 92 of the wind turbine blade component. The cavity is adapted to receive a beam 94 with bushings that align with the bushings of the wind turbine blade component 44. A pin 100 is then inserted through the beam 94 and the wind turbine blade component 44 to secure the segments 96, 98 together as seen in FIG. 3B). A more elaborate example of such segmented wind turbine blade may also be found in WO 2020/180601 A1.

In some embodiments, the wind turbine blade component is therefore a receiver of a segmented wind turbine blade and is adapted to receive a pin lock, the pin lock being placed through the bushing of the wind turbine component. These bushings 68 can also be used to hold the wind turbine blade component during attachment with the blade shell part with a component platform lock.

As the pin is attached through both the beam and wind turbine component, care is needed to ensure that the wind turbine component is precisely laid on the surface of the wind turbine shell. Further, the tolerance of the pin lock is small, since the different segments should be attached such that they essentially behave as one blade. It is therefore paramount that the wind turbine component 44 is precisely laid on the wind turbine shell 36, 38 and that the bushings are not damaged during the process.

Figure 4:
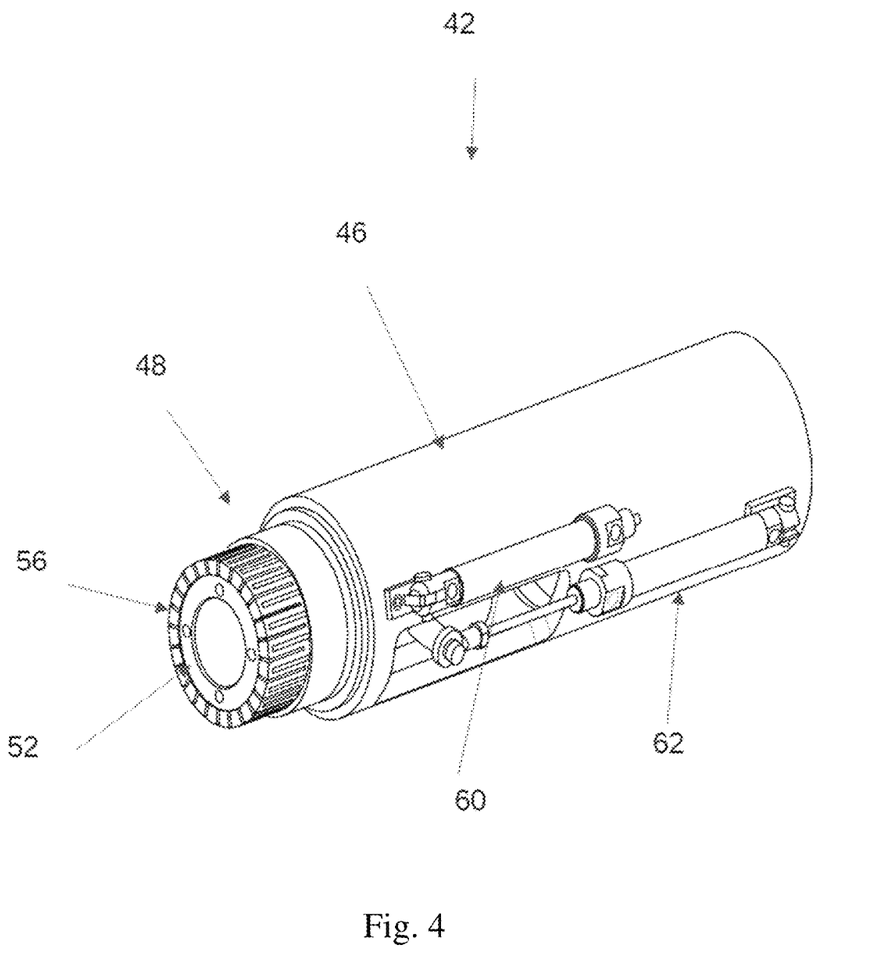
FIG. 4 illustrates an embodiment of a component platform lock comprising a first moving pin.
Figure 5:
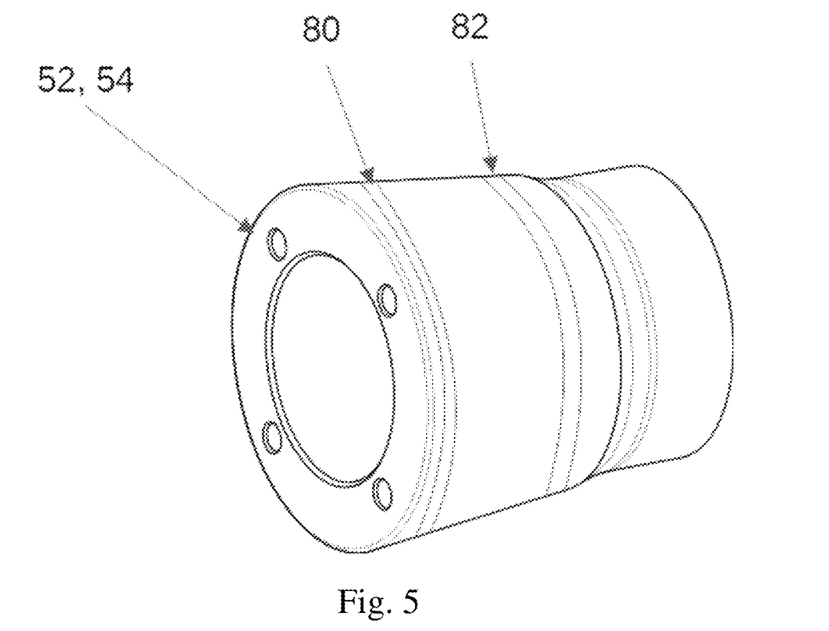
FIG. 5 illustrates an embodiment of an inner cone stud.

To hold the wind turbine blade component 44, a component platform lock 42 as shown in FIG. 4 is provided. The component platform lock 42 comprises a housing 46 and a first moving pin 48 that comprises a first inner cone stud 52. As seen in FIG. 5 the first inner cone stud 52 has a first diameter at a first section 80 and a second diameter at a second section 82, the first diameter being larger than the second diameter, so the first inner cone stud 52 is tapered. As seen in FIG. 4, a first collet 56 surrounds the first inner cone stud 52 and is adapted to move along the first inner cone stud 52 between the first section 80 and the second section 82.

As the first inner cone stud 52 moves relative to the first collet 56, the first collet 56 will expand and contract based on the location of an expanding section 84 of the first collet 56 relative to the inner cone stud 52. The size of the first collet 56 is therefore controllable based on its relative location on the first inner cone stud 54. The first collet 56 is therefore able to be in at least two states, a relaxed state where the first collet 56 is retracted and the expanding section 84 surrounds the second section 82 of the first inner cone stud 52 and an expanded state, where the first collet 56 is expanded and surrounds the first section 80 of the inner cone stud 52. The diameter of the first inner cone stud 52 is such that when the first collet 56 surrounds the first section 80, the combined diameter of the first collet 56 and the inner cone stud 52 is such that the first collet 56 engages the bushings 68 on the wind turbine blade component 44 (see FIG. 3).

As seen in FIG. 4, a first actuator 60 is attached to the first moving pin 48 in order to move the first collet 56 in and out of the bushings, such that the first moving pin 48 can be in at least two states. A contracted state where the first collet 56 is contained in the housing 46 and an extended state, wherein the first collet 56 is extended into the bushings 68. This means that when the first collet 56 is in the relaxed state the moving pin can move from the contracted state to the extended state to place the first collet 56 into the bushings 68 of the wind turbine blade component 44, whereafter the first collet 56 can expand from the relaxed state to the expanded state to engage the bushings 68 and hold/lock the wind turbine blade component 44.

As seen in FIG. 5, the first inner cone stud 52 is in some embodiments conical in shape, with a decreasing diameter from the first section 80 to the second section 82. This allows the first inner cone stud 52 to retract, moving the expanding section 84 of the first collet 56 from the second section 82 towards the first section 80 and ensuring that the first collet 56 engages the bushings 68 with adequate force. This means that the first collet 56 will expand into an inner face of the bushings 68, locking the wind turbine blade component 44 in place.

As seen in FIG. 4, in order to move the first inner cone stud 52 relative to the expanding section 84 of the collet 56, a second actuator 62 is attached to the first inner cone stud 52, such that the first inner cone stud 52 can move relative to the first collet 56. The first collet 56 is therefore able to expand and engage bushings 68 of the wind turbine blade component 44 and is able to disengage the bushings by moving the first inner cone stud 52.

Figure 7:
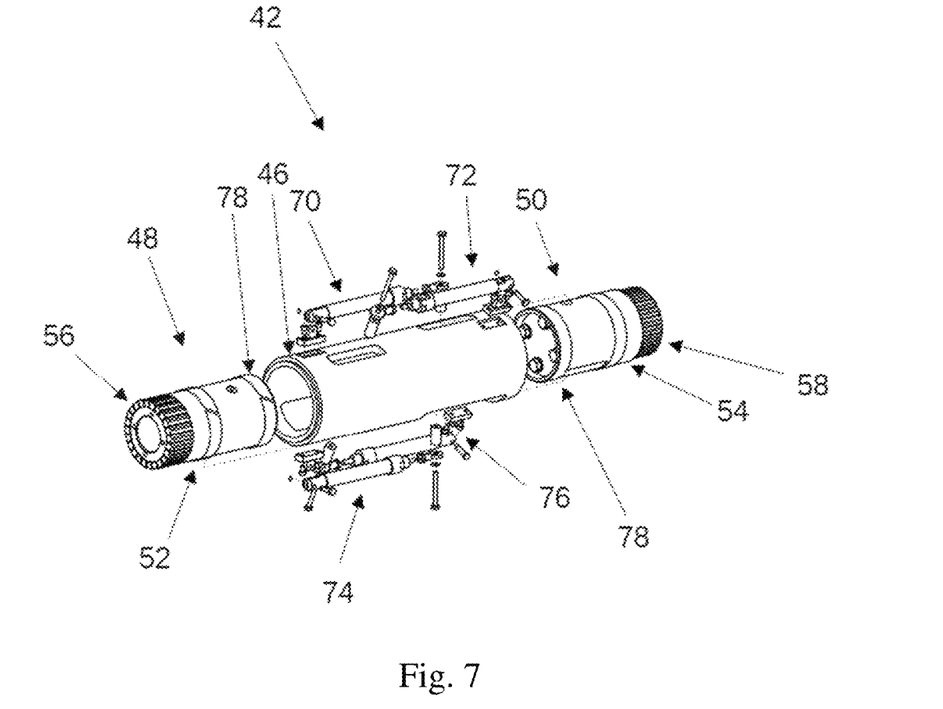
FIG. 7 illustrates an exploded view of an embodiment of a component platform lock.

In FIG. 4 the component platform lock 42 is able to hold the wind turbine blade component 44 at one engagement point, however, as shown in FIG. 7, it may in some embodiments be more advantageous to hold the wind turbine blade component at two or more engagement points, e.g. opposite engagement points. As seen in FIG. 7 the component platform lock may comprise a second moving pin 50 comprising a second inner cone stud 54 attached to the second moving pin 50. The second inner cone stud 54 has a first diameter at a first section 80 and a second diameter at a second section 82, as seen in FIG. 5, and is in some embodiments identical to the first inner cone stud 52, as previously described. The first diameter is larger than the second diameter. A second collet 58 having an expanding section 84 surrounds the second inner stud 54 and is configured to move along the second inner cone stud 54.

The second moving pin 50 can be moved by the first actuator 60 (see FIG. 4), which also moved the first moving pin 48. Thus, the first moving pin 48 and the second moving pin 50 may be moved together. Alternatively, the second moving pin 50 may be moved by a third actuator 70. Movement of the second moving pin 50 may be performed to obtain a contracted state wherein the second collet 58 is located within the housing 46, and to obtain an extended state wherein the second collet 58 is extended out of the housing 46. Further, the second inner cone stud 54 can be moved relative to the second collet 58 by the second actuator 62 (see FIG. 4), which also moved the first inner cone stud 52. Thus, the first inner cone stud 52 and the second inner cone stud 54 may be moved together. Alternatively, the second inner cone stud 54 may be moved relative to the second collet 58 by a fourth actuator 72. The second inner cone stud 52 may be moved relative to the second collet 58 to obtain a relaxed state wherein the expanding section 84 of the second collet is retracted and surrounds the second section 82 of the second inner cone stud 54 having the second diameter, and to obtain an expanded state wherein the expanding section 84 of the second collet surrounds the first section of the second inner cone stud having the first diameter and configured to engage and hold the wind turbine blade component. The second moving pin 50 is in some embodiments of equal construction as the first moving pin 48.

The first 60, second 62, third 70 and/or fourth actuator 72 are in some embodiments hydraulic, pneumatics, electrical or mechanical.

When the component platform lock 42 comprises a first and second moving pin 48, 50, the component platform lock 42 can engage the wind turbine blade component at two engagement points, which will in some embodiments give better stability. As shown in FIG. 7 the first and second moving pin 48, 50 may extend in opposite directions. This gives a symmetrically distribution of forces and further allows the component platform lock to engage in already existing bushings of an exemplary receiver of a segmented wind turbine blade, being assembled with a pin joint. The first and second moving pin 48, 50, can in some embodiments move independently from each other, such that they can extend asymmetrical into the bushings 68 of the wind turbine blade component 44. This allows the first and second collets 56, 58 to be adjusted to the individual bushings. The first and second moving pin 48, 50 being able to move independently further facilitates easier alignment, in that the first moving pin 48 may be aligned and extended first, and afterwards the second moving pin 50 may be aligned and extended.

Figure 6:
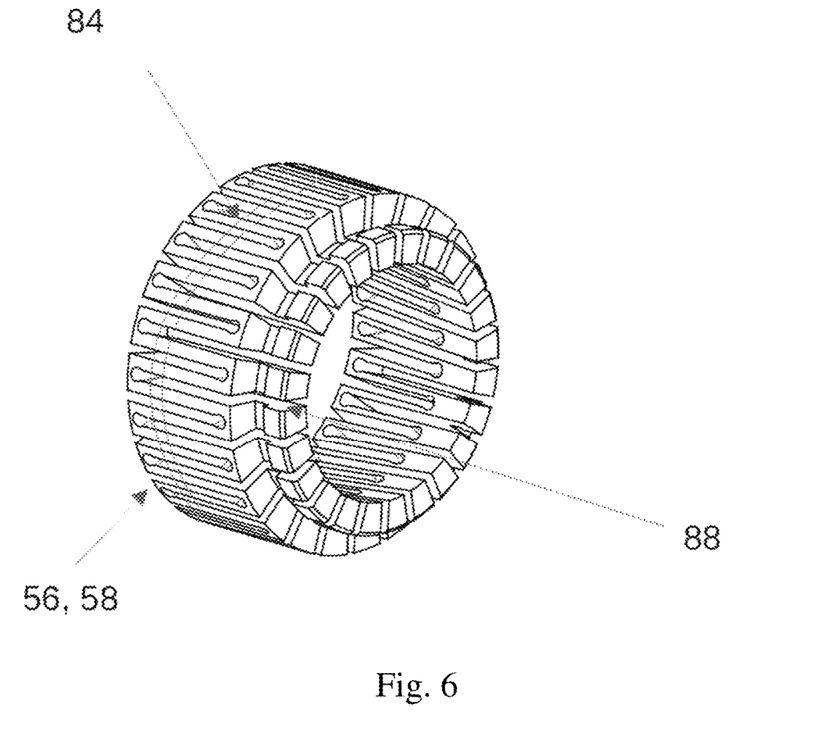
FIG. 6 illustrates an embodiment of a collet.
Figure 8:
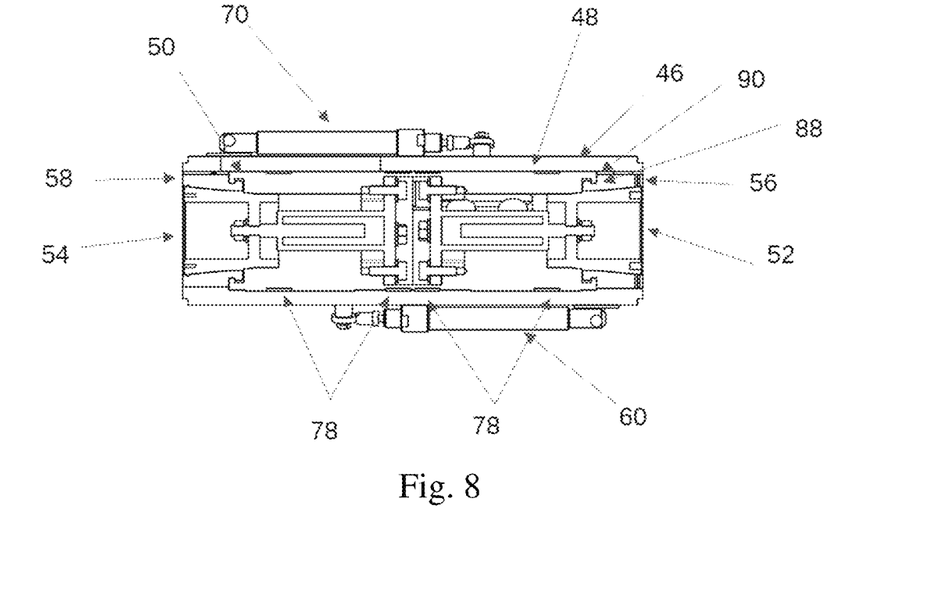
FIG. 8 illustrates a cross-sectional view of the component platform lock of FIG. 7.

A cross-sectional view of the component platform lock is shown in FIG. 8, wherein it is shown that the first and second collets 56, 58 in some embodiments may contain a flange 88 (also illustrated in FIG. 6) that is adapted to be locked to the first and second moving pin 48, 50 by a locking mechanism 90. This ensures that the first and second collets 56, 58 and respectively the first and second inner cone studs 52, 54 can be moved relative to each other, by holding the first and second collet 56, 58 in place. In some embodiments, piston rings 78 are used in order to ensure that the moving pin 48, 50 can move easier from the retracted state to the extended state.

Figure 9:
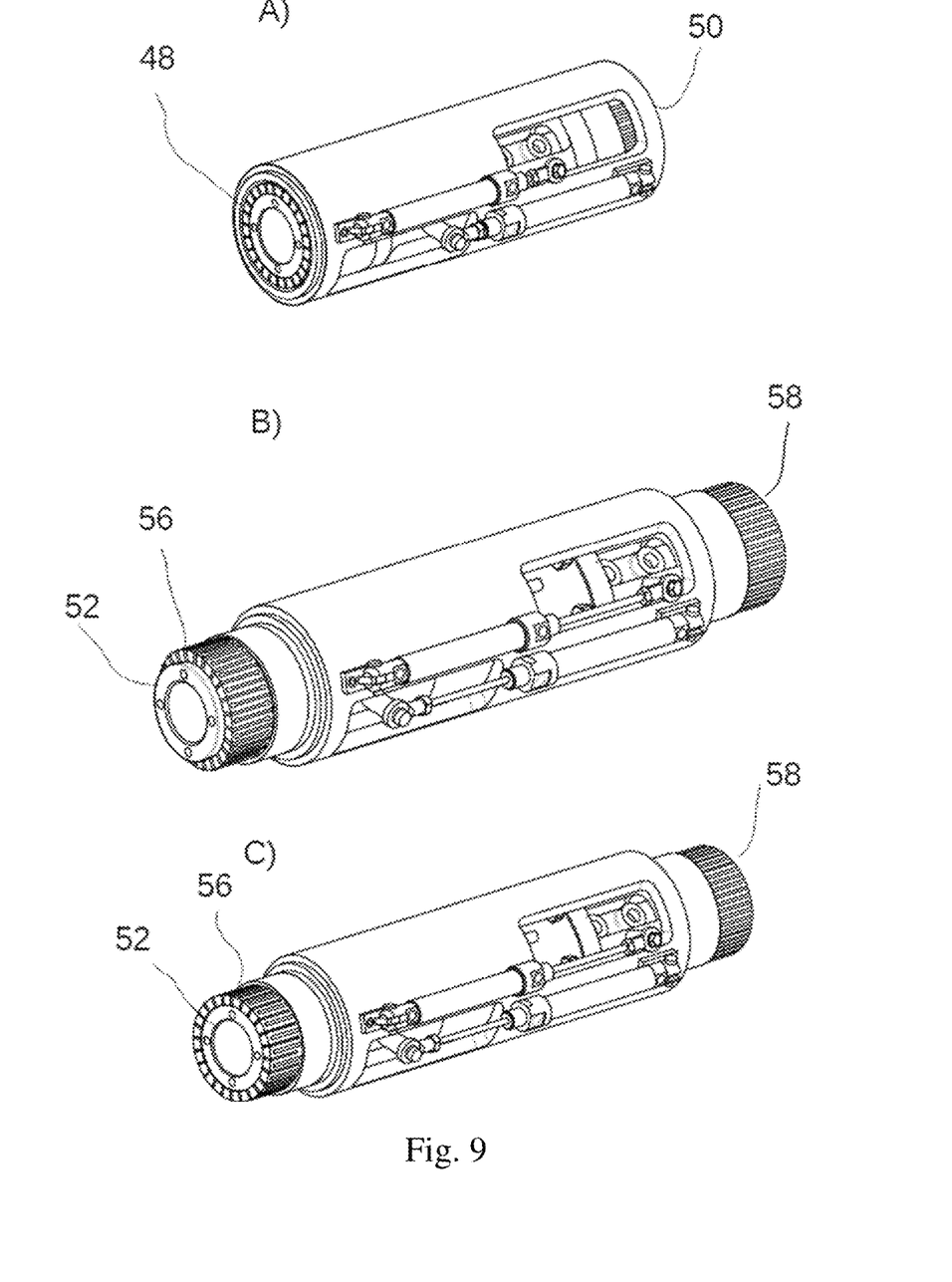
FIG. 9 illustrates different configurations of the component platform lock.

The different positions of the component platform lock 42 can be seen in FIGS. 9A), B), and C). 9A) shows the configuration wherein the first and second moving pins 48, 50 are retracted and the first and second collets 56, 58 are within the housing. In 9B) the first and second moving pin 48, 50 are extended out of the housing and the first and second collets 56, 58 are in their relaxed state, having a smaller diameter. In 9C) the first and second collets 56, 58 are in their expanded state, where they have a bigger diameter than in their relaxed state, such that they can expand into the bushings of the wind turbine blade component.

In some embodiment, the inner cone studs are pushed outwards, i.e. away from the housing 46, to change the state of the collets from the extended state to the relaxed state, and the inner cone studs are retracted, i.e. towards the housing 46, to change the state of the collets from the relaxed state to the extended state. In other embodiments, the inner cone studs are opposite, such that they are retracted, i.e. towards the housing 46, to change the state of the collets from the extended state to the relaxed state, and pushed outwards, i.e.

away from the housing 46, to change the state of the collets from the relaxed state to the extended state.

In order to facilitate and control movement of the first and/or second collets into the bushings a number of sensors can be utilized. The component platform lock could comprise an alignment sensor for aligning the first and/or the second moving pin with the bushings on the wind turbine blade component during the extension of the first and second moving pin into the bushings. A force sensor can measure the force exerted by the second and/or fourth actuator to ensure that the first and/or second collets engage the bushings with the correct force, such that the component platform lock sufficiently holds the wind turbine blade component. Further, an extension sensor can monitor the extension of the first and/or second moving pin to ensure that the first and second collets are sufficiently within the bushings.

Figure 10:
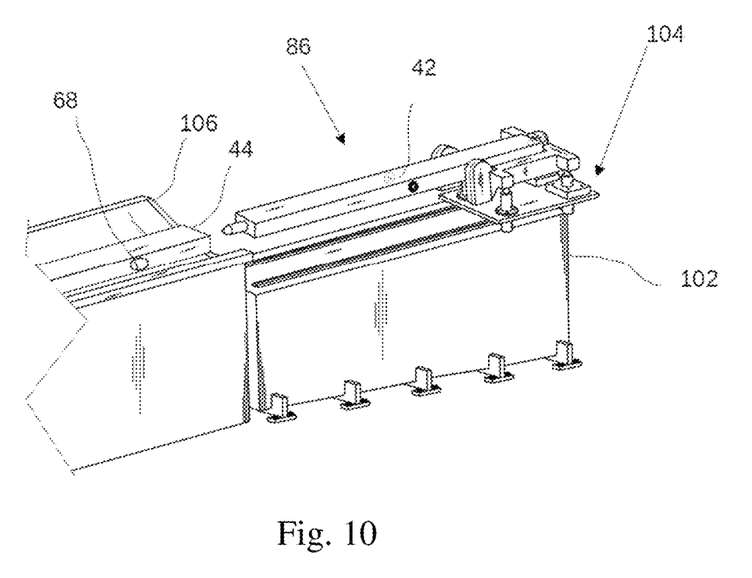
FIG. 10 illustrates a system for holding a wind turbine blade component relative to a shell part.

The component platform lock can form part of a system for attaching a wind turbine blade component to a surface of a wind turbine blade shell part at a component attachment position, the system comprising a blade shell part support 106 for supporting the blade shell part, a jig 104, see FIG. 10, comprising a jig base 102, a component platform 86 which comprises a component platform lock 42 for receiving and holding the wind turbine blade component in a first position above at least a part of the blade shell part, the component platform being arranged on the jig base 102 and being at least vertically displaceable relative to the jig base 102 by displacement means to allow the wind turbine blade component to be lowered from the first position to the component attachment position. In some embodiments the component platform is also displaceable in a horizontal direction, such as by tracks.

As seen in FIG. 10, the component platform lock 42 may be disposed within the jig, with its collets being able to extend out from the holes shown in the jig 104 to lock into the bushing 68 as shown on the wind turbine component 44 within the cavity of the wind turbine component 44.

The jig 104 can therefore hold the wind turbine blade component 44 in relation to the wind turbine shell part, by moving the component platform lock into a cavity of the wind turbine blade component, extending the first and/or second moving pin from the contracted state to the extended state to place the first and/or second moving pin into the bushing(s) of the wind turbine blade component, expanding the first and second collet from their relaxed state into their expanded state by moving the first inner cone stud to expand the first and second collets into the bushings to engage and hold the wind turbine blade component, and positioning the wind turbine blade component by use of the jig to an attachment position relative to the wind turbine blade shell part.

After the attachment of the wind turbine blade component, the first and second collet is retracted into their relaxed state to disengage the bushings by movement of the inner cone stud relative to the collets. The first and second moving pin are thereafter retracted. The component platform lock can then be moved out of the cavity of the wind turbine blade component.

The disclosure has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance but are included to identify individual elements. Furthermore, the labelling of a first element does not imply the presence of a second element and vice versa.

LIST OF REFERENCES 2 wind turbine
4 tower
6 nacelle
8 hub
10 blade
13 shell
14 blade tip
15 tip end
16 blade root
17 root end
18 leading edge
20 trailing edge
30 root region
32 transition region
34 airfoil region
36 pressure side shell part
38 suction side shell part
40 shoulder
42 component platform lock
44 wind turbine blade component
46 housing
48 first moving pin
50 second moving pin
52 first inner cone stud
54 second inner cone stud
56 first collet
58 second collet
60 first actuator
62 second actuator
64 alignment sensor
66 force sensor
68 bushings
70 third actuator
72 fourth actuator
74 extension sensor
76 cavity
78 piston rings
80 first section
82 second section
84 expanding section
86 component platform
88 flange
90 locking mechanism
92 cavity
94 Beam
96 first segment
98 second segment
100 pin
102 jig base
104 jig
106 blade shell support part

The invention claimed is:

1. A component platform lock (42) for holding a wind turbine blade component (44) during attachment of the wind turbine blade component to a wind turbine blade shell part, the component platform lock comprising:
 a housing (46),
 a first moving pin (48) comprising:
  a first inner cone stud (52) having a first diameter at a first section (80) and a second diameter at a second section (82), the first diameter being larger than the second diameter, a first collet (56) having an expanding section (84) surrounding the first inner cone stud (52) and configured to move along the first inner cone stud (52) between the second section and the first section, wherein the expanding section (84) of the first collet (56) will contract and expand based on the diameter of the cone stud, a first actuator (60) configured to move the first moving pin (48) to obtain:

a contracted state wherein the first collet is located within the housing, and an extended state wherein the first collet extends out of the housing, a second actuator (62) configured to move the first inner cone stud (52) relative to the first collet (56) to obtain:

a relaxed state wherein the expanding section of the first collet is retracted and surrounds the second section of the first inner cone stud having the second diameter, and an expanded state wherein the expanding section of the first collet is expanded and surrounds the first section of the first inner cone stud having the first diameter and configured to engage and hold the wind turbine blade component.

2. A component platform lock according to claim 1, further comprising a second moving pin (50) comprising a second inner cone stud (54), the second inner cone stud (54) having a first diameter at a first section and a second diameter at a second section, the first diameter being larger than the second diameter, a second collet (58) having an expanding section (84) surrounding the second inner stud (54) and configured to move along the second inner cone stud (54).

3. A component platform lock according to claim 2, wherein the first actuator (60) or a third actuator configured to move the second moving pin (50) to obtain:

a contracted state wherein the second collet is located within the housing, and an extended state wherein the second collet extends out of the housing, the second actuator (62) or a fourth actuator configured to move the second inner cone stud (52) relative to the second collet (56) to obtain:

a relaxed state wherein the expanding section of the second collet is retracted and surrounds the second section of the second inner cone stud having the second diameter, and an expanded state wherein the expanding section of the second collet is expanded and surrounds the first section of the second inner cone stud having the first diameter and configured to engage and hold the wind turbine blade component.

4. A component platform lock according to claim 2, wherein the first and second moving pin (48, 50) extend in opposite directions.

5. A component platform lock according to claim 2, further comprising an alignment sensor (64) for aligning the first and second moving pin with bushings (68) of the wind turbine blade component.

6. A component platform lock according to claim 2, further comprising a force sensor (66) measuring the force exerted by the second and/or fourth actuator (62).

7. A component platform lock according to claim 2, further comprising an extension sensor for monitoring the extension of the first or second moving pin.

8. A component platform lock according to claim 2, wherein the first, second, third and/or fourth actuator are hydraulic, pneumatics, electrical or mechanical.

9. A component platform lock according to claim 2, wherein the first and/or second inner cone stud are conical in shape, decreasing linearly in diameter from the first section to the second section.

10. A system for attaching a wind turbine blade component to a surface of a wind turbine blade shell part at a component attachment position, the system comprising:

a blade shell part support for supporting the blade shell part, a jig, comprising:

i. a jig base, ii. a component platform comprising a component platform lock according to claim 1 for receiving and holding the wind turbine blade component in a first position above at least a part of the blade shell part, the component platform being arranged on the jig base and being at least vertically displaceable relative to the jig base by displacement means to allow the wind turbine blade component to be lowered from the first position to a component attachment position.

11. A method for holding a wind turbine blade component during attachment of the wind turbine blade component to a wind turbine blade shell part, wherein the wind turbine blade component comprises a cavity containing one or more bushings at the cavity's sidewalls, the method comprising:

providing a jig comprising a component platform lock according to claim 1, moving the component platform lock into the cavity of the wind turbine blade component, extending the first moving pin from the contracted state to the extended state to place the first moving pin into a busing of the one or more bushings of the wind turbine blade component, expanding the first collet from its relaxed state into their expanded state by moving the first inner cone stud to expand the first collet in the bushing to engage and hold the wind turbine blade component, and positioning the wind turbine blade component by use of the jig to a component attachment position relative to the wind turbine blade shell part.

12. A method according to claim 11, the method further comprising:

retracting the first collet into their relaxed state to disengage the bushings after attachment of the wind turbine blade component, retracting the first moving pin, and moving the component platform lock out of the cavity of the wind turbine blade component.

13. A method according to claim 11, wherein the jig with the component platform further comprises a second moving pin (50) comprising a second inner cone stud (54), the second inner cone stud (54) having a first diameter at a first section and a second diameter at a second section, the first diameter being larger than the second diameter, a second collet (58) having an expanding section (84) surrounding the second inner stud (54) and configured to move along the second inner cone stud (54), the method further comprising:

extending the second moving pin from the contracted state to the extended state to place the second moving pin into a second bushing of the one or more bushings of the wind turbine blade component, expanding the second collet from its relaxed state into its expanded state by moving the second inner cone stud to expand the second collet in the second bushing to engage and hold the wind turbine blade component.

14. A method according to claim 13, the method further comprising:

retracting the second collet into its relaxed state to disengage the second bushing after attachment of the wind turbine blade component, retracting the second moving pin.

15. A method according to claim 11, the method further comprising monitoring the expansions of the first and second collets by measuring the force exerted by the second and/or fourth actuator and stopping the expansion when the force exerted reaches a threshold.

\* \* \* \* \*